United States Patent [19]

Freed

[11] Patent Number: 5,537,719
[45] Date of Patent: Jul. 23, 1996

[54] TWO-WAY ADJUSTABLE TIE

[76] Inventor: Anna B. Freed, 185 E. 85th St., New York, N.Y. 10028

[21] Appl. No.: 357,721

[22] Filed: Dec. 16, 1994

Related U.S. Application Data

[63] Continuation-in-part of Ser. No. 22,354, Feb. 25, 1993, Pat. No. 5,377,387.

[51] Int. Cl.⁶ ................................ B65D 63/00
[52] U.S. Cl. ............. 24/16 PB; 24/17 AP; 24/30.5 P
[58] Field of Search ............... 24/16 PB, 17 AP, 24/30.5 P, 585

[56] References Cited

U.S. PATENT DOCUMENTS

| | | | |
|---|---|---|---|
| 3,653,099 | 4/1972 | Hoffman | 24/16 PB |
| 3,747,164 | 7/1973 | Fortsch | 24/17 AP |
| 4,501,354 | 2/1985 | Hoffman | 24/16 PB |
| 4,573,242 | 3/1986 | Lankton et al. | 24/16 PB |
| 4,665,588 | 5/1987 | Nakand | 24/16 PB |
| 4,908,911 | 3/1990 | Bretti et al. | 24/16 PB |
| 4,976,017 | 12/1990 | Frand | 24/585 |
| 5,224,244 | 7/1993 | Ikeda et al. | 24/16 PB |

*Primary Examiner*—Victor N. Sakran
*Attorney, Agent, or Firm*—Darby & Darby

[57] ABSTRACT

A reusable and releasable tie according to the present invention has no moving parts, and has the ability to expand and contract in discrete increments while being tied. The tie consists of a strap and a holder. The strap has ratchet teeth on top and bottom. The holder has ratchet teeth on the upper and lower surface of its interior, which may be pawled to increase the gripping strength. To switch the tie from an expanding to a contracting position, and vice versa, the user slides or swivels the holder to a different position relative to the strap. To expand or contract the tie, the user may pull on the strap in the desired direction. If the holder is in the expanding position, the tie automatically expands when contents are added due to the increase in pressure on the inside of the strap. The ties can be configured as a one piece tie, as a tie with variable length strap and a double holder, or as two pieces (strap and holder). The tie may be spring loaded so that it returns to a fixed position when released. The ties may have connected holders so that a series of ties may be moved from one position to another in unison requiring only one motion from the user. The ties may have internal and/or external position maintenance devices which maintain the holder in a fixed position with respect to the strap. The tie may have up to five positions; the tie may: (1) tighten discretely; (2) loosen discretely; (3) tighten continuously; (4) loosen continuously; or (5) be locked from movement in either direction.

22 Claims, 6 Drawing Sheets

TWO-WAY ADJUSTABLE TIE

BACKGROUND OF THE INVENTION

This application is a continuation-in-part of application Ser. No. 08/022,354 filed Feb. 25, 1993, now U.S. Pat. No. 5,377,387.

1. Field of the Invention

The present invention relates to ties, fasteners, straps, or belts and, in particular, to a two-way adjustable tie which can be used to tie garments, packages, cables, orthopedic devices etc.

2. Description of the Related Art

Current art ties commonly consist of ties made of plastic and ties made of velcro. The plastic ties often contain a ratchet and pawl mechanism. The ratchet allows discrete tightening or contracting in one direction. The pawl allows continuous loosening or expansion in the opposite direction. The pawl must be biased to release and is often difficult for the user to access and/or actuate. In addition, the pawl often wears out or breaks down after repeated usage.

Ties made of velcro do not have as strong a gripping capability and tend to further lose their gripping strength after repeated usage or laundering. Additionally, velcro ties must be totally undone to be adjusted. The Two-Way Adjustable Tie of the present invention overcomes the disadvantages of the plastic and velcro ties and additionally has advantages that no known ties currently have.

SUMMARY OF THE INVENTION

The ties of the present invention have many benefits and properties that current art plastic ties do not have including: (1) the ties of the present invention are readily adjustable and/or releasable in "both" directions; (2) the ties of the present invention have no moving parts to wear out or break down; and (3) the ties of the present invention require significantly less strength and/or dexterity to adjust or release.

The ties of the present invention have many benefits over velcro including: (1) the ties of the present invention do not wear out and lose their grip as velcro does; (2) the ties of the present invention can be adjusted, both tightened or loosened, while tied; and (3) the ties of the present invention are stronger and more durable than velcro.

The ties of the present invention also have advantages over laces because: (1) they do not loosen during wear; (2) they do not come undone; (3) they do not wear out or become dirty; and (4) they are easier to tie and adjust than laces (this is especially important for children and the elderly who might lack manual dexterity or strength).

The ties of the present invention may be discretely tightened or contracted when the strap and holder are in a given orientation relative to each other. The ties may be discretely loosened or expanded when the strap and holder are in a different orientation relative to each other. The orientation of the strap within the holder determines whether the tie may be discretely loosened or tightened, continuously loosened or tightened, or locked. Although the embodiments shown are similar in function and utility, any given embodiment may prove easier to use, cheaper to manufacture, more durable and/or reliable, more suited for a given purpose or a specific demographic segment.

OBJECTIVES

An object of the present invention is to produce a tie which is inexpensive and easily manufactured and molded, has no moving parts, is strong, durable, reliable, and is easy to use.

A further object of the present invention is to produce a tie which can be discretely tightened or loosened without untying, that the discrete increments may range from very small to very large, and that the expanding increments may be different from the contracting increments for fine adjustment in one direction and coarse adjustment in the other direction.

Another object of the present invention is for a tie which can be discretely or continuously tightened, loosened, or locked while requiring a minimum of physical strength or dexterity thus having properties that are lacking from current art state of the art ties. The present invention is the only known tie which has the property of "automatic expansion".

It is a further object of the present invention to eliminate the need to inventory different length ties. The strap could be cut to a desired length as needed. These variable length ties would use double holders as shown in FIGS. 8–13.

Still another object of the present invention is for the strap to contain numerical indicia enabling the user to set the tie to a fixed length, measure progress (as with orthopedic braces), or measure the girth of the contents.

Another object of the present invention is to produce a tie which can be adjusted using only one hand.

Another object of the present invention is to produce a tie where the holder includes an internal and/or external device to help maintain the position of the strap within the holder so that it cannot be readily dislodged.

Another object is to produce a tie which automatically returns to a given position when released, (i.e., the tie may be spring loaded).

Another object of this invention is that two or more ties may be locked or unlocked with one motion.

Other objects, features and characteristics of the present invention, as well as the methods of operation and functions of the related elements of structure, and the combination of parts and economies of manufacture will become more apparent upon consideration of the following detailed description and the appended claims with reference to the accompanying drawings all of which form a part of the specification, wherein like reference numerals designate corresponding parts in the various figures.

Figure 8:
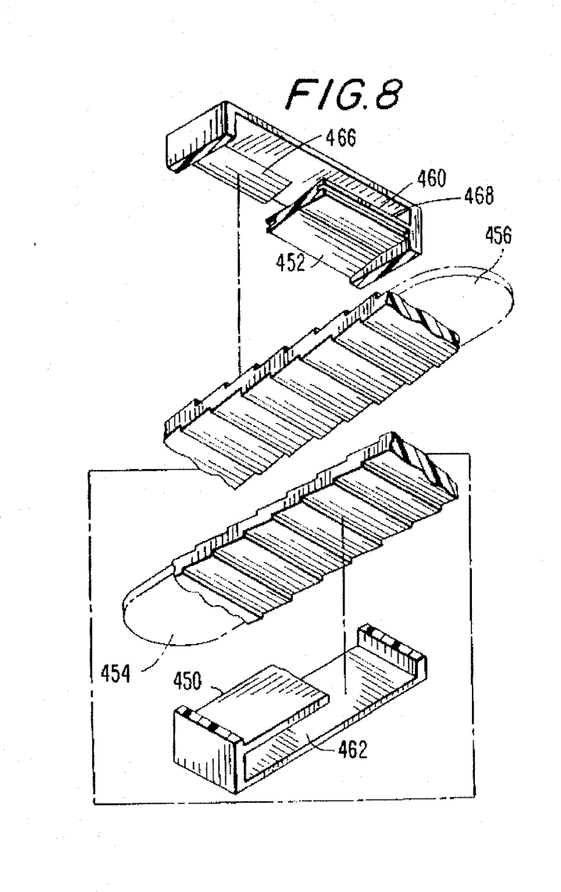
FIG. 8 shows an exploded perspective view of the double holder slide tie.
Figures 9, 10:
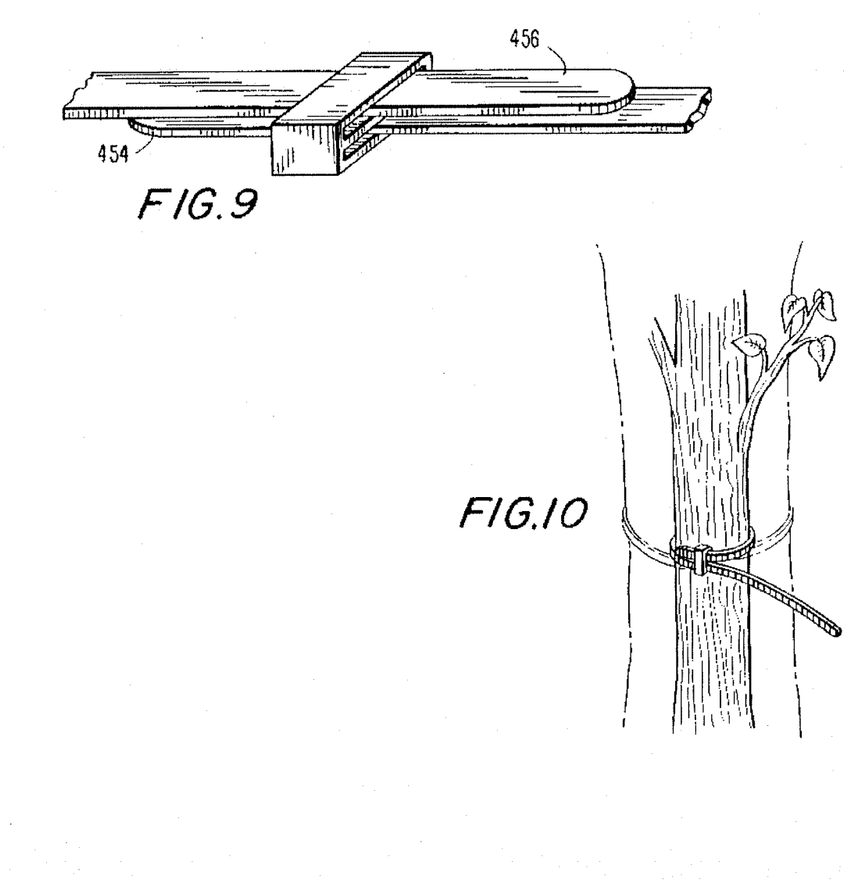
FIG. 9 shows a side view of the double holder slide tie.
FIG. 10 shows the tie of FIG. 8 tied around a tree and, in phantom lines in an expanded condition after the tree has grown.
Figure 11:
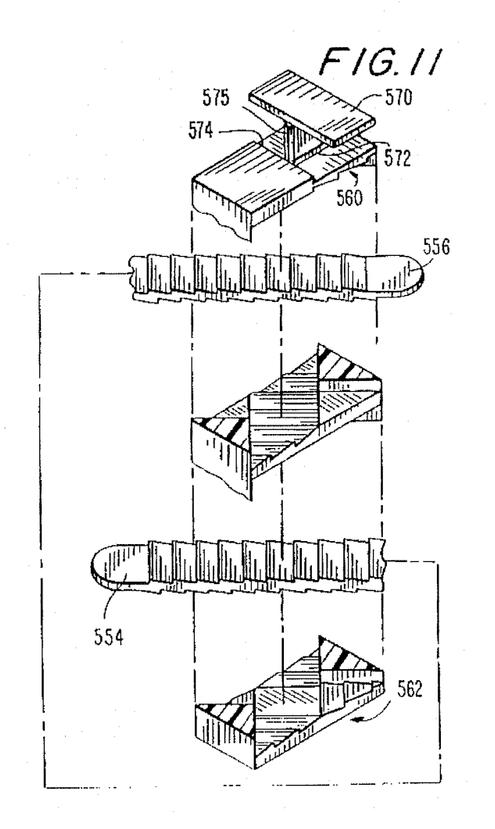
FIG. 11 shows an exploded perspective view of the double holder swivel tie having an external locking or position maintaining device attached, which is unlocked.
Figure 12A:
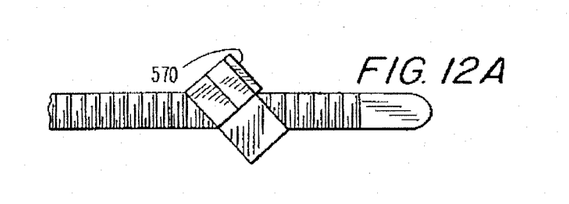
FIG. 12A shows a top view of the tie of FIG. 11 in the loosening position.
Figures 12B, 13A, 13B:
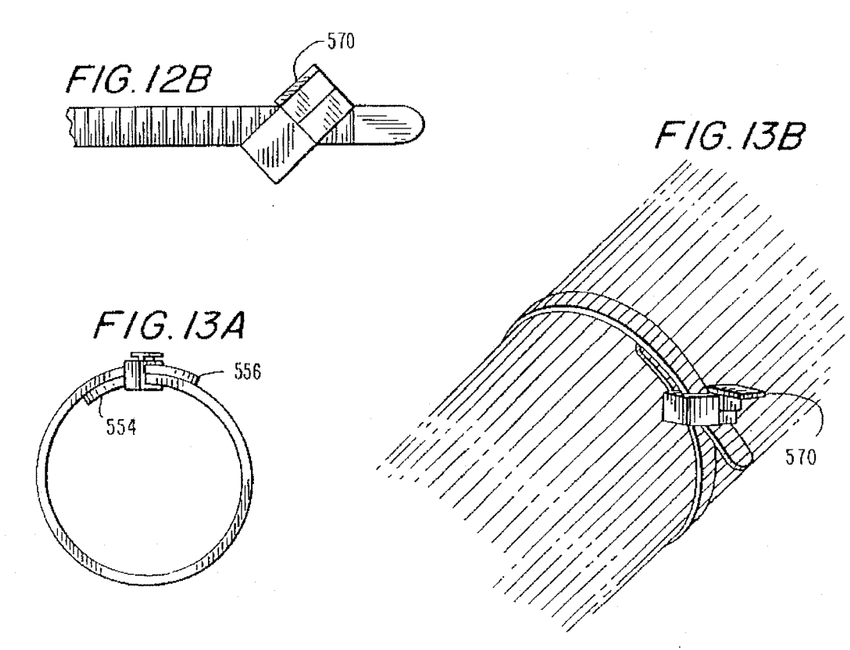
FIG. 12B shows a top view of the tie of FIG. 11 in the tightening position.
FIG. 13A shows a side view of the tie of FIG. 11 tied in a circle.
FIG. 13B shows a perspective of the tie of FIG. 11 tied around cables and an external locking device, which is shown in a locked position.
Figures 14, 15A, 15B, 16:
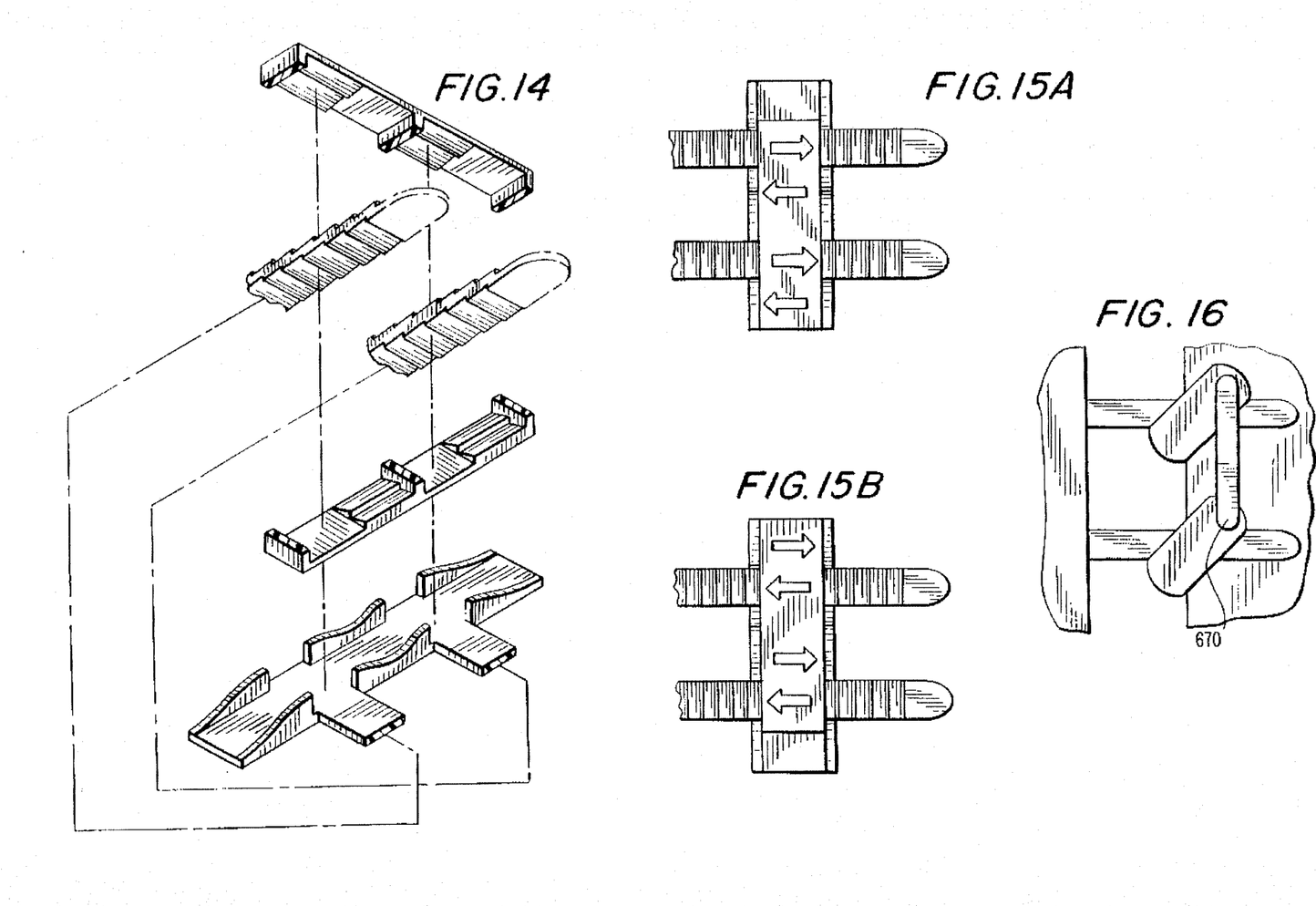
FIG. 14 shows an exploded perspective view of the slide tie of FIG. 1 with connected heads.
FIG. 15A shows a top view of the tie of FIG. 14 in the tightening position.
FIG. 15B shows a top view of the tie of FIG. 14 in the loosening or expanding position.
FIG. 16 shows a top view of the swivel tie of FIGS. 4 and 4B with connected holders.

"Slide" and "swivel" embodiments are shown. In order to switch from the discrete tightening position to the discrete loosening position and vice versa, the slide tie holder "slides" back and forth FIGS. 1–3, and the swivel tie holder "swivels" or pivots about an axis FIGS. 4–6. The ties may have internal and/or external devices which help maintain the position of the strap relative to the holder. The slide and swivel ties are further shown with a double holder. The slide tie having a double holder is shown in FIGS. 8–10, and the swivel tie having a double holder is shown in FIGS. 11–13. The slide and swivel ties are also shown with their holders connected, thus enabling the user to lock or unlock all the ties in one motion. The slide tie with connected holders is shown in FIG. 14. The swivel tie with connected holders is shown in FIG. 16.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENTLY PREFERRED EXEMPLARY EMBODIMENTS

A first embodiment of the present invention is shown in FIGS. 1–3D. The tie 110 includes a strap 112 and a holder 114. The strap 112 includes a first set of teeth 113 on its upper surface and a second set of teeth 115 on its lower surface. The holder 114 includes an upper inner surface 116 and a lower inner surface 118. The upper inner surface 116 is integrally connected to the lower inner surface 118 as a one piece assembly by connecting members 124.

Figure 1:
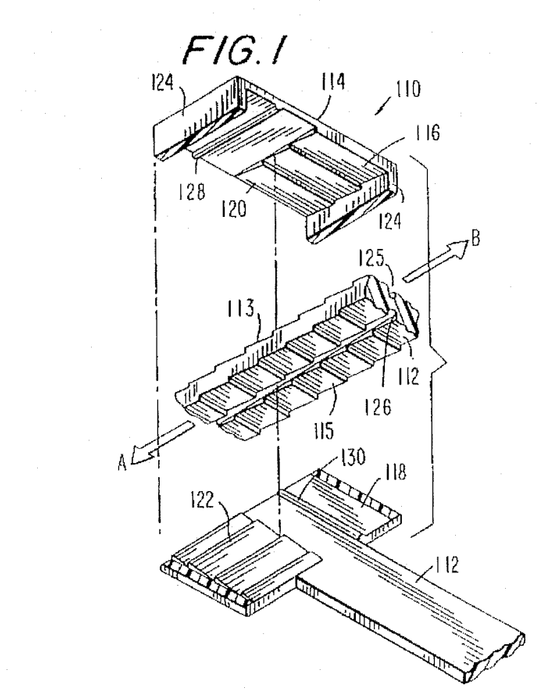
FIG. 1 shows an exploded perspective view of the slide tie and a strap attached to the holder.

The teeth 113 are shaped to mate with the teeth 120 so that the strap 112 will not move in the direction of arrow A, but allows ratcheting movement in the direction of arrow B. Similarly, the teeth 115 are shaped to mate with the teeth 122 so that the strap 112 will not move in the direction of arrow B, but allows movement in the direction of arrow A.

The upper inner surface 116 of the holder 114 includes approximately half of its surface being covered by teeth 120. The lower inner surface 118 also includes about half of its surface being covered by teeth 122. The teeth 120 are positioned on the opposite half of the surface being covered by the teeth 122. Also, the teeth 120 and 122 are arranged to ratchet in opposite yet parallel directions. The width of teeth 120, 122 on the holder is equal to the width of teeth 113, 115 on the strap 112. The simultaneous engagement of multiple teeth on the strap and holder and/or the width of the teeth function to help maintain the position of the strap within the holder.

Figures 2A, 2B:
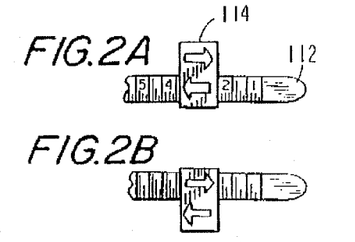
FIG. 2A shows a top view of the slide tie in the loosening position.
FIG. 2B shows a top view of the slide tie in the tightening position.
Figure 2C:
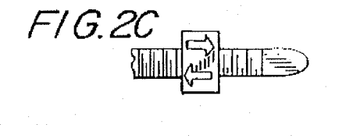
FIG. 2C shows a top view of the slide tie in the locked position.

The upper inner surface 116 of the holder has a track 128 which travels in the groove 125 on top of the strap. Similarly, the lower inner surface 118 has a track 130 which travels in the groove 126 on the bottom of the strap. The tracks 128 and 130 also help maintain the position of the strap within the holder. The track on the top inner surface 128 engages with the groove 125 on top of the strap when the tie is being loosened (in the direction of arrow A as shown in FIG. 2A). The track on the bottom inner surface 130 engages with the groove 126 on the strap when the tie is being tightened (in the direction of arrow B as shown in FIG. 2B). The tracks 128, 130 are on either side of the strap when the tie is locked. In the locked position (FIG. 2C), the tie cannot move in either direction because both the upper and lower teeth of the strap and holder are engaged.

Figure 1A:
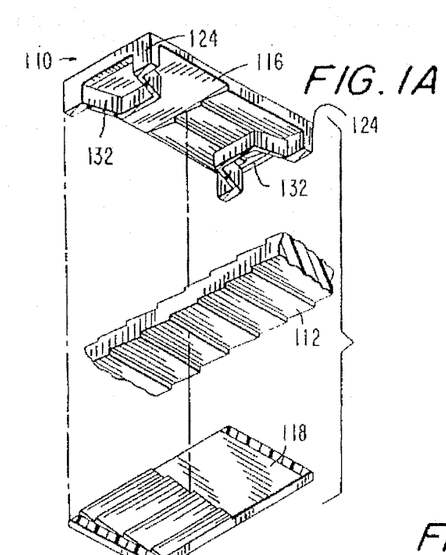
FIG. 1A shows an exploded perspective view of the slide tie with an internal spring loaded device.

FIG. 1A shows the tie with an internal spring member 132. The spring member 132 pushes the strap to the middle position of the holder so that it is locked. This force may be overcome by the user when he or she tightens or loosens the tie. When the user lets go however, the strap is returned to the center of the holder due to the force of the spring members 132, and the tie is once again locked (i.e., both top and bottom teeth are engaged and the tie cannot be loosened or tightened).

Figure 1B:
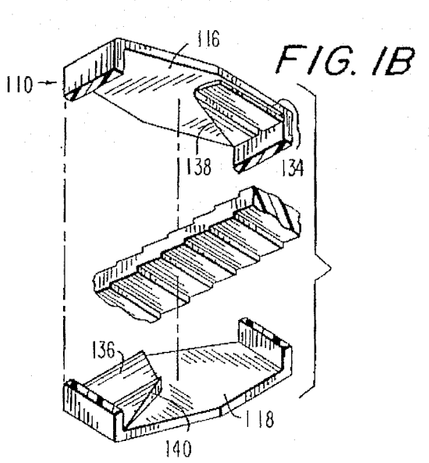
FIG. 1B shows an exploded perspective view of the slide tie that also swivels and has one pawled tooth on top and bottom for extra strength.
Figures 3A, 3B, 3C, 3D:
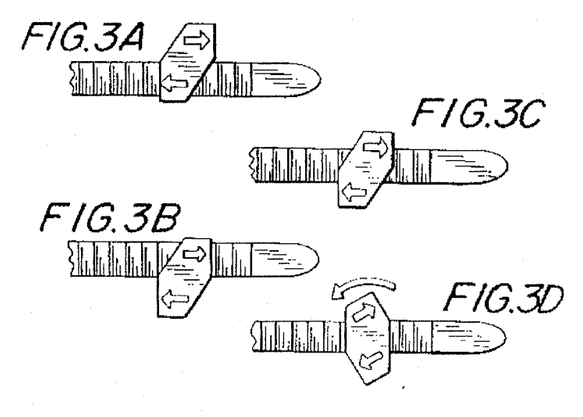
FIG. 3A shows a top view of the tie of FIG. 1B in the loosening position.
FIG. 3B shows a top view of the tie of FIG. 1B in the tightening position.
FIG. 3C shows a top view of the tie of FIG. 1B in the locked position.
FIG. 3D shows a top view of the tie of FIG. 1B in the continuously tightening and loosening position.

The tie of FIG. 1B is shown including a pawled tooth 134 on the top inner surface 116 and a pawled tooth 136 on the bottom inner surface 118. This tie has an additional property in that it has a position for continuous adjustment. The user may place the tie in a continuous adjustment position by swiveling the holder 45 degrees to the left as shown in FIG. 3D. The inside walls of the truncated tooth on top 138 and bottom 140 serve to maintain the position of the strap within the holder while the tie may be continuously adjusted in either direction. In this position, the teeth on the strap do not mate with the teeth in the holder and the tie may thus be continuously adjusted i.e., tightened or loosened. The tie of FIG. 1B therefore has five positions; 1—discrete loosening (FIG. 3A), 2—discrete tightening (FIG. 3B), 3—continuous loosening (FIG. 3D), 4—continuous tightening (FIG. 3D) and 5—locked (FIG. 3C).

A second embodiment of the present invention is shown in FIGS. 4–6C. The two piece tie 210 includes a strap 212 and a holder 214. The strap 212 includes a first set of teeth 213 on its upper surface and a second set of teeth 215 on its lower surface. The holder 214 includes an upper inner surface 216 and a lower inner surface 218. The upper inner surface 216 is integrally connected to the lower inner surface 218 by connecting members 224.

Figure 4:
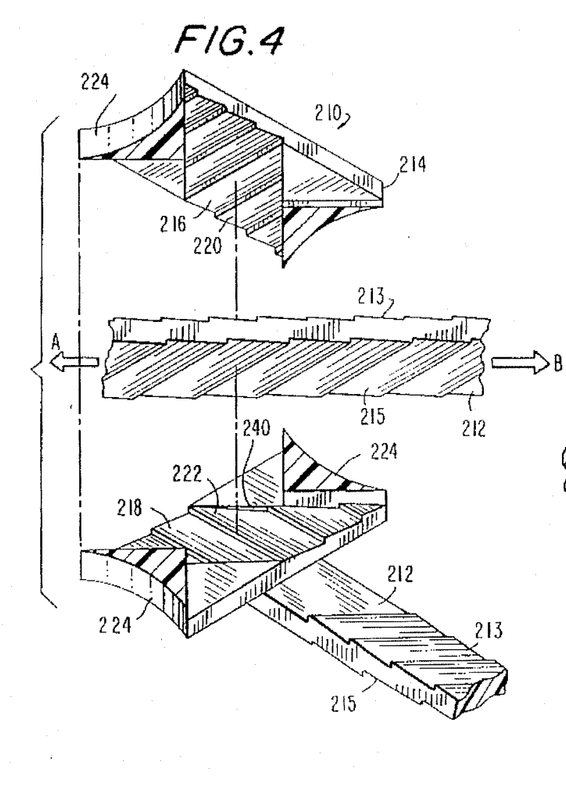
FIG. 4 shows an exploded perspective view of the swivel tie connected to a strap.

The upper teeth 213 are shaped to mate with the upper inner teeth 220 so that the strap 212 will not move in the direction of arrow A, but allows ratcheting movement in the direction of arrow B. Similarly, the teeth 215 are shaped to mate with teeth 222 so that the strap 212 will not move in the direction of arrow B, but allows movement in the direction of arrow A. The underside of the bottom of the holder 214 contains a device 236 which can be either snapped into the strap or attached to the item being bound. This attachment device 236, shown in FIG. 4A allows the holder 214 to swivel with respect to the strap 212 from one position to another. The external shape of the connecting members 224 may be concave so that the user may easily grasp the holder with his/her thumb and index finger to swivel or pivot the holder from one position to another.

A portion of the upper inner surface 216 of the holder includes teeth 220. The lower inner surface 218 has a complimentary portion which also includes teeth 222. Of course, the entire upper inner surface may be covered by teeth and the entire lower inner surface may be covered by teeth. In this configuration, the holder in FIG. 4 would have no undercuts and injection molding would be simplified. The upper portion of the holder 214 is integrally connected to the lower portion of the holder by connecting members 224. The inner sides of the connecting members 224 are parallel and spaced at a distance slightly greater than the width of the strap to guide the strap through the holder. The inner angle of the connecting members 224 is shown at approximately 90 degrees but it may, of course be somewhat larger or smaller.

Figure 4A:
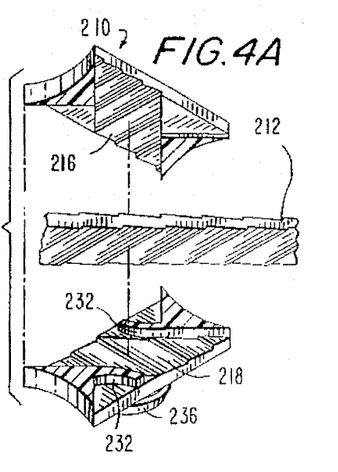
FIG. 4A shows an exploded perspective view of the swivel tie with an internal spring loaded device.

The teeth 220 and 222 of FIG. 4 are shown as being parallel to each other and are disposed in the same direction. The top teeth 220 are narrower than the bottom teeth 222. The teeth on top of the strap 213 mate with the teeth on top of the holder 220 and are narrower than the teeth on bottom of the strap 215 which mate with the teeth on the bottom of the holder 222. The teeth in the straps of FIGS. 4 and 4A are positioned acutely to the length of the strap and perpendicular to each other. The different sized teeth on top and bottom enable fine tightening and coarse (or quicker) loosening or vice versa.

The height of the inner walls 238, 240 of the flat portions 239, 241 on the upper inner surface and the lower inner surface of the holder is approximately equal to the top of the ratchet teeth 220, 222 and act as an internal position maintaining device. They guide the strap and maintain its position when pulled through the holder. The user must force the strap past the walls 238, 240 when he switches the tie from a tightening to a loosening position and vice versa.

Figure 5A:
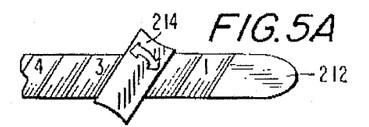
FIG. 5A shows a top view of the tie in FIG. 4 in the discrete loosening position.
Figure 5B:
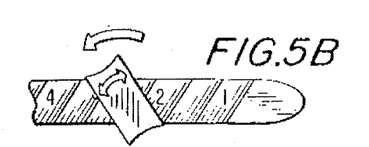
FIG. 5B shows a top view of the tie in FIG. 4 in the discrete tightening position.
Figure 6A:
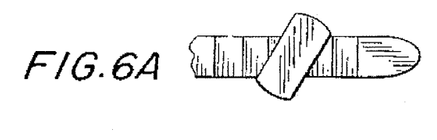
FIG. 6A shows a top view of the tie in FIG. 4B in the discrete tightening position.
Figure 6B:
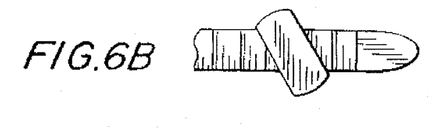
FIG. 6B shows a top view of the tie in FIG. 4B in the discrete loosening position.
Figure 6C:
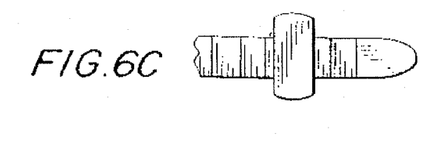
FIG. 6C shows a top view of the tie in FIG. 4B in the continuous tightening or loosening position.

FIG. 4A shows the tie 210 in the loosening position. As the strap 212 moves in the direction of arrow A the user will feel the strap 212 ratchet with respect to the holder 214. In FIG. 5B the strap 212 is shown with the holder being oriented such that the strap 212 may be discretely tightened to the desired length. To loosen the strap 212 the user will pivot the holder 214 in the clockwise direction to the position shown in FIG. 5A. The user can now move the strap 212 in the direction of arrow A, opposite the direction of arrow B with respect to the holder 214. The user can then feel the strap ratchet with respect to the holder as the strap 212 moves over each tooth in the holder and is loosened. To allow continuous release of the strap in either direction the user turns the holder half way between 5A and 5B and perpendicular to the strap. In this orientation as shown in FIG. 6C, neither the top or bottom ratchets are engaged with the ratchets in the holder and the strap may be moved continuously in either direction for tightening or loosening.

FIG. 4A shows the swivel tie with an internal spring loading device 232. This device forces the tie back to a given position and helps maintain that position when it has been released by the user.

Figure 4B:
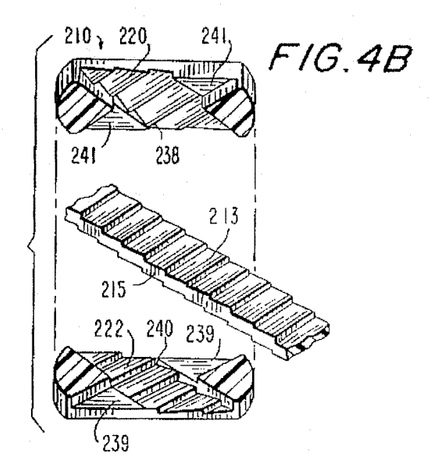
FIG. 4B shows an exploded perspective view of the swivel tie of FIG. 4 having teeth in the holder and strap oriented in an alternate configuration.

FIG. 4B shows the swivel tie with the teeth on the strap being parallel to each other and being perpendicular to the length of the strap. The teeth in the holder are at an angle (i.e., perpendicular) to each other. Additionally the top and bottom teeth are the same size.

Figure 7A:
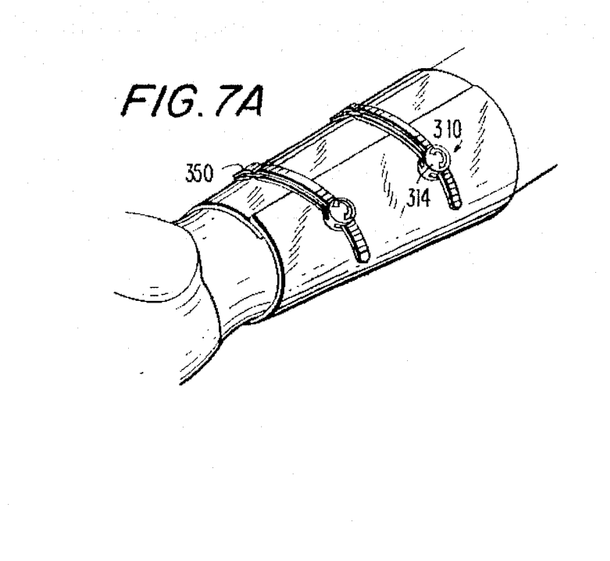
FIG. 7A shows the swivel tie in use on an orthopedic device.

FIG. 7A shows the use of a swivel tie according to the present invention holding a bandage. This tie 310 is wrapped around a D-Ring 350 and therefore may be tightened while using only one hand. If the holder 314 is left in the expansion position the tie will automatically expand in discrete increments as the arm swells. If the user does not anticipate swelling, he would leave the holder in the tightening position so that the tie can not expand.

Figure 7B:
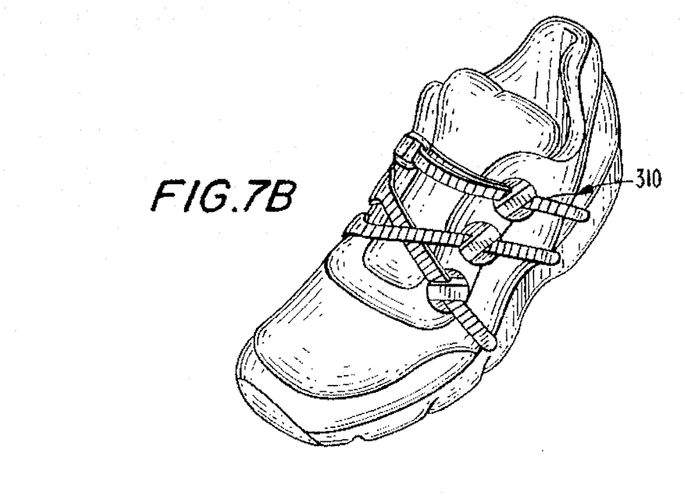
FIG. 7B shows the swivel tie in use on a sneaker.

FIG. 7B shows a strap and holder on a sneaker. When the user wishes to step out of the sneaker, (s)he swivels the holder to the loosening position. As the user steps out, the ties 310 will automatically loosen or expand due to the pressure from inside of the tie from the user's foot.

Figure 7C:
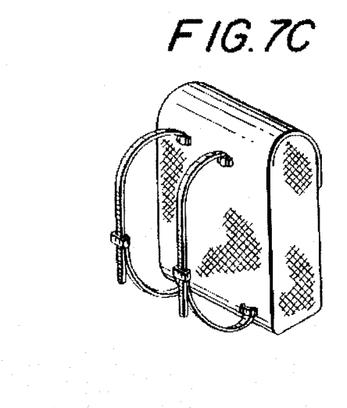
FIG. 7C shows the slide tie in use on a back pack.

FIG. 7C shows the slide tie being used, for example, on a back pack. Of course, the tie could be used on a gym bag, hand bag or other kinds of luggage. This tie could be spring loaded as shown in FIG. 1A so that it always returns to the locked position.

Figure 7D:
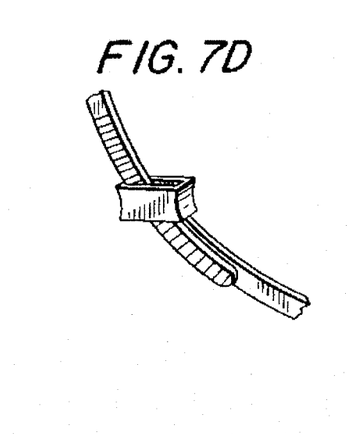
FIG. 7D shows the swivel tie in use on a seat belt.

FIG. 7D shows the swivel tie on a seat belt. This tie could be spring loaded as shown in FIG. 4A so that it automatically returns to a predetermined position (e.g., locked or unlocked) after the user has finished adjusting it.

Figure 7E:
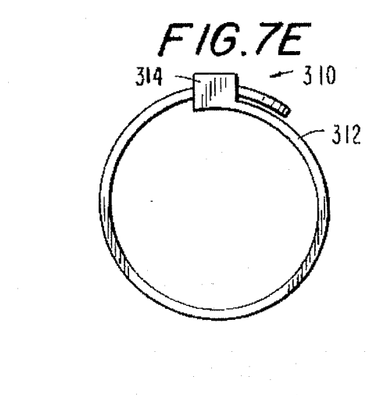
FIG. 7E shows the slide tie used as a hose clamp.

FIG. 7E shows the slide tie being used as a hose clamp. This slide tie is composed of one piece of plastic and is easily locked, discretely tightened, or discretely loosened by sliding the holder back and forth.

FIG. 8 shows the slide tie with a double holder. The top part of the holder 460 holds one end of the strap 456 and the bottom part of this holder 462 holds the other end of the strap 454. The bottom part of the holder 462 has one pawled tooth 452 along the entire length of its upper inner surface 450. The strap end 454 that is placed in the bottom part of the holder 462, only moves in one direction and cannot be pulled out. The top part of the holder 460 has a pawled tooth on its top inner surface 466 and a pawled tooth one its bottom inner surface 468. The top part of this holder functions similarly to the slide holder in FIG. 1, in that the tie has three positions. The strap in the top part of the holder may be tightened, loosened or locked. FIG. 9 shows a side view of this tie. Both ends of the strap may slide back and forth in the holder. When the top end of the strap 456 slides back and forth in the top part of the holder 460 it changes from a tightening position to a locked position to a loosening position. When the bottom end of the strap 454 slides back and forth in the bottom part of the holder 462 it remains in the same position and cannot be loosened. FIG. 10 shows this double tie being wound around a tree. The double tie is shown in the expansion position. As the tree grows, the tie automatically expands while still being tied around the tree. Currently the ties on tagged trees are removed and replaced with new bigger ties as the trees grow. Of course, the tie can have graduated markings of indicia, similar to a ruler, to easily measure the growth of the tree.

FIG. 11 shows the swivel tie with a double holder. The top portion of the holder 560 holds one end of the strap 556 and the bottom portion of the holder 562 holds the other end of the strap 554. The bottom portion of the holder 562 is configured so that whether the tie is in the loosening or tightening position, the bottom portion of the strap 554 may not be removed from the bottom of the holder 562. The top portion of the strap may be discretely tightened or discretely loosened similar to FIG. 4B. This double headed swivel tie additionally has an external locking device 570. This device is attached to the top outside of the holder by a living hinge 572. This external device helps maintain the expanding or contracting position tie. A part of this external device 575 snaps into a groove 574 on the top surface of the holder. A portion of this external position maintaining device 570 protrudes upwardly for the user to grasp when he wants to move the device in order to change the position of the holder with respect to the strap. FIG. 12A shows the holder maintained in a loosening position. FIG. 12B shows the holder maintained in a tightening position. FIG. 13A shows a side view of this double swivel holder. FIG. 13B shows a perspective view of this tie around cables. The external locking device 570 helps maintain the tie in an expanding or contracting position and protrudes from the holder for easy access by the user. Depending on the use and possibility of dislodgement, a plurality of internal and external position maintenance devices may be used.

FIG. 14 shows a perspective view of two slide ties which are attached as a one piece assembly. The user need simply slide the assembly back and forth to change from a tightening to a loosening position and vice versa.

FIG. 15A shows the ties of FIG. 14 in the tightening position and FIG. 15B shows the ties of FIG. 14 in the loosening position.

FIG. 16 shows two swivel heads that are connected by a top member 670. When one of these heads is swiveled to another position the other head also will swivel to the other position since they are connected. In this manner all heads are changed from one position to another with only one movement. FIGS. 14 and 16 serve as just two examples of how the holders for slide and swivel ties may be connected. Many other devices for position maintenance or for connecting the holders so that they may move in unison, may be readily determined by one of ordinary skill in the art.

While this invention has been described in connecting with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A two-way adjustable tie comprising:
   (a) a strap having a plurality of teeth;
   (b) a holder including upper and lower members and a pair of connecting members, said connecting members connecting said upper and said lower members;
   (c) a discrete tightening means wherein said holder cooperates with said strap for permitting discrete ratchet tightening of said strap when said strap and said holder are in a first orientation with respect to each other;
   (d) a discrete loosening means wherein said holder cooperates with said strap for permitting discrete ratchet loosening of said strap when said strap and said holder are in a second orientation with respect to each other; and
   (e) a position maintaining means for maintaining orientation of said strap with respect to said holder in one of said first orientation and said second orientation.

2. A two-way adjustable tie according to claim 1, wherein said plurality of teeth on said strap are a first set of teeth disposed on an upper surface of said strap and a second set of teeth disposed on a lower surface of said strap, said first set of teeth being oriented in a direction opposite to said second set of teeth.

3. A two-way adjustable tie according to claim 2, wherein said first set of teeth are disposed parallel to said second set of teeth.

4. A two-way adjustable tie according to claim 2, wherein said first set of teeth are disposed at an angle with respect to said second set of teeth.

5. A two-way adjustable tie according to claim 2, wherein said holder upper member has at least one upper tooth and said holder lower member has at least one lower tooth, said at least one upper tooth is oriented in the opposite direction and parallel with respect to said at least one lower tooth.

6. A two-way adjustable tie according to claim 5, wherein one of said at least one upper tooth and said at least one lower tooth is pawled.

7. A two-way adjustable tie according to claim 2, wherein said upper member of said holder contains at least one upper tooth and said lower member of said holder contains at least one lower tooth, said at least one upper tooth is oriented in the same direction and parallel with respect to said at least one lower tooth.

8. A two-way adjustable tie according to claim 2, wherein said holder upper member has at least one upper tooth and said holder lower member has at least one lower tooth, wherein said at least one upper tooth is disposed at an angle with respect to said at least one lower tooth.

9. A two-way adjustable tie according to claim 1, having a continuous adjustment means whereby said holder cooperates with said strap for continuous loosening and continuous tightening of a length of said strap when said strap and said holder are in an orientation with respect to each other other than said first orientation and said second orientation.

10. A two-way adjustable tie according to claim 1, further including a locking means whereby said holder cooperates with said strap for fixing the length of said strap with respect to said holder when said strap and said holder are in an orientation with respect to each other other than said first orientation and said second orientation.

11. A two-way adjustable tie according to claim 1, wherein said position maintaining means includes a spring loading device for automatically returning said holder to a fixed orientation with respect to said strap.

12. A two-way adjustable tie according to claim 1, wherein said position maintaining means is internal to said holder.

13. A two-way adjustable tie according to claim 11, wherein said internal position maintaining means includes a track and a groove.

14. A two-way adjustable tie according to claim 1, wherein said position maintaining means is external to said holder.

15. A two-way adjustable tie according to claim 14, wherein said position maintaining means includes a living hinge.

16. A two-way adjustable tie according to claim 1, wherein said holder further includes a bottom member, wherein said strap has a first end and a second end, said bottom member holding one of said first end and said second end of said strap and permitting movement of said one end of said strap in one direction only.

17. A two-way adjustable tie according to claim 1, further including at least a second holder being attached to said holder and wherein a position change in one of said at least a second holder effects a position change in the remaining of said holders.

18. A two-way adjustable tie according to claim 17, wherein said at least a second holder is integrally attached to said holder.

19. A two-way adjustable tie according to claim 1, wherein said strap moves from one of said first orientation and said second orientation to the other of said first orientation and said second orientation by sliding said holder with respect to said strap.

20. A two-way adjustable tie according to claim 1, wherein said strap moves from one of said first orientation and said second orientation to the other of said first orientation and said second orientation by pivoting said holder with respect to said strap.

21. A two-way adjustable tie according to claim 1, wherein a discrete tightening means prevents loosening of said strap in said first orientation.

22. A two-way adjustable tie according to claim 1, wherein a discrete loosening means prevents tightening of said strap in said second orientation.

* * * * *